(12) United States Patent
Strunk

(10) Patent No.: US 8,905,083 B2
(45) Date of Patent: Dec. 9, 2014

(54) ENERGY DISSIPATIVE TUBES AND METHODS OF FABRICATING AND INSTALLING THE SAME

(71) Applicant: Titeflex Corporation, Springfield, MA (US)

(72) Inventor: Jordan Strunk, Portland, TN (US)

(73) Assignee: Titeflex Corporation, Springfield, MA (US)

( * ) Notice: Subject to any disclaimer, the term of this patent is extended or adjusted under 35 U.S.C. 154(b) by 0 days.

(21) Appl. No.: 13/712,168

(22) Filed: Dec. 12, 2012

(65) Prior Publication Data

US 2013/0192708 A1 Aug. 1, 2013

Related U.S. Application Data

(63) Continuation of application No. PCT/US2012/059893, filed on Oct. 12, 2012.

(60) Provisional application No. 61/591,500, filed on Jan. 27, 2012.

(51) Int. Cl.

| | |
|---|---|
| *F16L 9/14* | (2006.01) |
| *F16L 11/12* | (2006.01) |
| *F16L 11/04* | (2006.01) |
| *F16L 11/115* | (2006.01) |
| *F16L 11/118* | (2006.01) |
| *F16L 11/08* | (2006.01) |

(52) U.S. Cl.
CPC .......... *F16L 11/1185* (2013.01); *F16L 11/125* (2013.01); *F16L 11/045* (2013.01); *F16L 11/115* (2013.01); *F16L 11/085* (2013.01)
USPC .......................... 138/138; 138/143; 138/121

(58) Field of Classification Search
USPC .......................... 138/138, 121, 149, 141, 146
See application file for complete search history.

(56) References Cited

U.S. PATENT DOCUMENTS 3,828,112 A * 8/1974 Johansen et al. ................ 174/47
4,103,320 A 7/1978 de Putter
(Continued)

FOREIGN PATENT DOCUMENTS

| CN | 1648508 A | 8/2005 |
|---|---|---|
| CN | 1892087 A | 1/2007 |
| WO | 2009007511 A1 | 1/2009 |

OTHER PUBLICATIONS

International Search Report and Written Opinion, International Application No. PCT/US12/059893.

*Primary Examiner* — Patrick F Brinson
(74) *Attorney, Agent, or Firm* — Saul Ewing LLP; Brian R. Landry

(57) ABSTRACT

One aspect of the invention provides an energy dissipative tube including: a length of tubing; an inner resin layer surrounding an outer surface of said tubing, wherein said inner resin layer is substantially free of a fire retardant; a non-expanded metal foil adjacent to an outer surface of said inner resin layer; and an outer resin layer surrounding said metal foil and said inner resin layer, wherein said outer resin layer includes a fire retardant. Another aspect of the invention provides an energy dissipative tube include: a length of tubing; an inner resin layer surrounding an outer surface of said tubing, wherein said inner resin layer is static dissipative; a non-expanded metal foil adjacent to an outer surface of said inner resin layer; and an outer resin layer surrounding said metal foil and said inner resin layer, wherein said outer resin layer is conductive.

16 Claims, 5 Drawing Sheets

(56) References Cited

U.S. PATENT DOCUMENTS

| | | |
|---|---|---|
| 4,215,384 A | 7/1980 | Elson |
| 4,394,705 A * | 7/1983 | Blachman .................... 361/215 |
| 4,595,431 A | 6/1986 | Bohannon, Jr. et al. |
| 4,984,605 A | 1/1991 | Schippl |
| 5,284,184 A | 2/1994 | Noone et al. |
| 5,483,412 A | 1/1996 | Albino et al. |
| 5,553,896 A * | 9/1996 | Woodward .................... 285/47 |
| 5,716,193 A | 2/1998 | Mondet et al. |
| 5,858,492 A | 1/1999 | Roeber et al. |
| 5,932,686 A | 8/1999 | Hoff |
| 5,960,977 A | 10/1999 | Ostrander et al. |
| 6,039,084 A * | 3/2000 | Martucci et al. ............. 138/137 |
| 6,257,281 B1 | 7/2001 | Nie et al. |
| 6,370,945 B2 | 4/2002 | Roberts |
| 6,409,225 B1 * | 6/2002 | Ito .............................. 285/222.1 |
| 6,883,549 B2 | 4/2005 | Schippl |
| 7,044,167 B2 | 5/2006 | Rivest |
| 7,052,751 B2 * | 5/2006 | Smith et al. .................. 428/35.9 |
| 7,268,562 B2 | 9/2007 | Aisenbrey |
| 7,308,911 B2 * | 12/2007 | Wilkinson .................... 138/104 |
| 7,367,364 B2 | 5/2008 | Rivest et al. |
| 2004/0140668 A1 | 7/2004 | Monsheimer et al. |
| 2004/0200537 A1 | 10/2004 | Rivest |
| 2004/0261877 A1 * | 12/2004 | Buck et al. .................... 138/127 |
| 2005/0173011 A1 | 8/2005 | Noone et al. |
| 2006/0254662 A1 | 11/2006 | Rivest et al. |
| 2007/0193642 A1 * | 8/2007 | Werner et al. ................. 138/127 |
| 2008/0169643 A1 | 7/2008 | Marban et al. |
| 2008/0236695 A1 * | 10/2008 | Takagi ......................... 138/126 |
| 2008/0236784 A1 | 10/2008 | Liebel |
| 2009/0026756 A1 | 1/2009 | Bowman |
| 2009/0114304 A1 * | 5/2009 | Mohri et al. .................. 138/138 |
| 2009/0139596 A1 | 6/2009 | Kuyl et al. |
| 2010/0126617 A1 | 5/2010 | Stroempl et al. |
| 2011/0000572 A1 * | 1/2011 | Ramaswamy et al. ........ 138/149 |
| 2011/0041944 A1 | 2/2011 | Duquette et al. |
| 2011/0042139 A1 | 2/2011 | Duquette et al. |

* cited by examiner

ENERGY DISSIPATIVE TUBES AND METHODS OF FABRICATING AND INSTALLING THE SAME

RELATED APPLICATIONS

This application is a continuation of International Application No. PCT/US12/59893, filed Oct. 12, 2012, which claims priority to U.S. Provisional Patent Application Ser. No. 61/591,500, filed on Jan. 27, 2012. This application is also related to, but does not claim priority to, U.S. patent application Ser. No. 13/584,074, filed Aug. 13, 2012, and U.S. Provisional Patent Application Ser. No. 61/544,516, filed on Oct. 24, 2011. The entire content of each application is hereby incorporated by reference herein.

FIELD OF INVENTION

The present invention relates to gas, liquid, and slurry piping systems as well as protective conduit systems for cable carrying purposes, and more particularly to piping or tubing systems incorporating jackets and fittings capable of transferring and dissipating energy.

BACKGROUND OF THE INVENTION

Gas and liquid piping systems utilizing corrugated stainless steel tubing ("CSST") and fittings are known. Such piping systems can be designed for use in combination with elevated pressures of up to about 25 psi or more and provide advantages over traditional rigid black iron piping systems in terms of ease and speed of installation, elimination of onsite measuring, and reduction in the need for certain fittings such as elbows, tees, and couplings.

Oftentimes, electrical currents will occur inside a structure. These electrical currents, which can vary in duration and magnitude, can be the result of power fault currents or induced currents resulting from lightning interactions with a house or structure. The term "fault current" is typically used to describe an overload in an electrical system, but is used broadly herein to include any electrical current that is not normal in a specific system. These currents can be the result of any number of situations or events such as a lightning event. Electrical currents from lightning can reach a structure directly or indirectly. Direct currents result from lightning that attaches to the actual structure or a system contained within the structure. When current from a nearby lightning stroke moves through the ground or other conductors into a structure, it is referred to as indirect current. While both direct and indirect currents may enter a structure through a particular system, voltage can be induced in other systems in the structure, especially those in close proximity to piping systems. This can often result in an electrical flashover or arc between the adjacent systems. A flashover occurs when a large voltage differential exists between two electrical conductors, the air ionizes, and the material between the conductive bodies are punctured by the high voltage to form a spark.

SUMMARY OF THE INVENTION

One aspect of the invention provides an energy dissipative tube including: a length of tubing; an inner resin layer surrounding an outer surface of said tubing, wherein said inner resin layer is substantially free of a fire retardant; a non-expanded metal foil adjacent to an outer surface of said inner resin layer; and an outer resin layer surrounding said metal foil and said inner resin layer, wherein said outer resin layer includes a fire retardant.

This aspect of the invention can have a variety of embodiments. The inner resin layer can include one or more materials selected from the group consisting of: a polymer, a thermoplastic polymer, and a thermoset polymer. The inner resin layer can include one or more materials selected from the group consisting of: a low density polyethylene, a linear low density polyethylene, a mixture of low density polyethylene with ethylene vinyl acetate, and a mixture of linear low density polyethylene with ethylene vinyl acetate.

The inner resin layer can be conductive. The inner resin layer can have a surface resistivity between about $10^3$ and about $10^6$ ohm/in$^2$.

The inner resin layer can be static dissipative. The inner resin layer can have a surface resistivity between about $10^6$ and about $10^9$ ohm/in$^2$.

The inner resin layer can be antistatic. The inner resin layer can have a surface resistivity between about $10^9$ to about $10^{12}$ ohm/in$^2$.

The inner resin layer can have a thickness between about 0.015" and about 0.030". The inner resin layer can have a hardness between about 90 A and about 55 D durometer. The inner resin layer can have a specific gravity of between about 0.91 and about 1.2.

The outer resin layer can include one or more materials selected from the group consisting of: a polymer, a thermoplastic polymer, and a thermoset polymer.

The outer resin layer can be conductive. The outer resin layer can have a surface resistivity between about $10^3$ and about $10^6$ ohm/in$^2$.

The outer resin layer can be static dissipative. The outer resin layer can have a surface resistivity between about $10^6$ and about $10^9$ ohm/in$^2$.

The outer resin layer can be antistatic. The outer resin layer can have a surface resistivity between about $10^9$ and about $10^{12}$ ohm/in$^2$.

The outer resin layer can have a thickness between about 0.012" and about 0.030". The outer resin layer can have a hardness between about 90 A and about 55 D durometer. The outer resin layer can have a specific gravity of between about 1.2 and about 1.5.

The metal foil can have a thickness between about 0.001" and about 0.005". The metal foil can be wrapped helically around said tubing. The metal foil can completely surrounds the inner resin layer. The metal foil can include one or more selected from the group consisting of: copper, aluminum, brass, bronze, silver, and gold.

The tubing can be corrugated tubing. The tubing can be metallic tubing. The tubing can be thin-walled tubing. The tubing can be flexible tubing.

The inner resin layer can be substantially free of a fire retardant selected from the group consisting of: metallic hydroxides, metallic trihydrates, and halogenated fire retardants. The inner resin layer can be substantially free of a fire retardant selected from the group consisting of: magnesium hydroxide, aluminum trihydrate, and antimony trioxide. The inner resin layer can include less than 5% of said fire retardant by weight. The inner resin layer can include less than 1% of said fire retardant by weight.

The outer resin layer can include a fire retardant selected from the group consisting of: metallic hydroxides, metallic trihydrates, and halogenated fire retardants. The outer resin layer can include a fire retardant selected from the group consisting of: magnesium hydroxide, aluminum trihydrate, and antimony trioxide. The outer resin layer can include between about 20% and about 60% of said fire retardant by weight.

Another aspect of the invention provides an energy dissipative tube include: a length of tubing; an inner resin layer surrounding an outer surface of said tubing, wherein said inner resin layer is static dissipative; a non-expanded metal foil adjacent to an outer surface of said inner resin layer; and an outer resin layer surrounding said metal foil and said inner resin layer, wherein said outer resin layer is conductive.

This aspect of the invention can have a variety of embodiments. The inner resin layer can include one or more materials selected from the group consisting of: a polymer, a thermoplastic polymer, and a thermoset polymer. The inner resin layer can include one or more materials selected from the group consisting of: a low density polyethylene, a linear low density polyethylene, a mixture of low density polyethylene with ethylene vinyl acetate, and a mixture of linear low density polyethylene with ethylene vinyl acetate.

The inner resin layer can have a surface resistivity between about $10^6$ and about $10^9$ ohm/in$^2$. The inner resin layer can have a thickness between about 0.015" and about 0.030". The inner resin layer can have a hardness between about 90 A and about 55 D durometer. The inner resin layer can have a specific gravity of between about 0.91 and about 1.2.

The outer resin layer can include one or more materials selected from the group consisting of: a polymer, a thermoplastic polymer, and a thermoset polymer.

The outer resin layer can have a surface resistivity between about $10^3$ and about $10^6$ ohm/in$^2$. The outer resin layer can have a thickness between about 0.012" and about 0.030". The outer resin layer can have a hardness between about 90 A and about 55 D durometer. The outer resin layer can have a specific gravity of between about 1.2 and about 1.5.

The metal foil can have a thickness between about 0.001" and about 0.005". The metal foil can be wrapped helically around said tubing. The metal foil can completely surround said inner resin layer. The metal foil can include one or more selected from the group consisting of: copper, aluminum, brass, bronze, silver, and gold.

The tubing can be corrugated tubing. The tubing can be metallic tubing. The tubing can be thin-walled tubing. The tubing can be flexible tubing.

The inner resin layer can be substantially free of a fire retardant selected from the group consisting of: metallic hydroxides, metallic trihydrates, and halogenated fire retardants.

The outer resin layer can include a fire retardant selected from the group consisting of: magnesium hydroxide, aluminum trihydrate, and antimony trioxide. The outer resin layer can include a fire retardant selected from the group consisting of: metallic hydroxides, metallic trihydrates, and halogenated fire retardants. The outer resin layer can include a fire retardant selected from the group consisting of: magnesium hydroxide, aluminum trihydrate, and antimony trioxide.

Another aspect of the invention provides an energy dissipative tube including: a length of tubing; an inner resin layer surrounding an outer surface of said tubing, wherein said inner resin layer is antistatic; a non-expanded metal foil adjacent to an outer surface of said inner resin layer; and an outer resin layer surrounding said metal foil and said inner resin layer, wherein said outer resin layer is conductive.

This aspect of the invention can have a variety of embodiments. The inner resin layer can include one or more materials selected from the group consisting of: a polymer, a thermoplastic polymer, and a thermoset polymer. The inner resin layer can include one or more materials selected from the group consisting of: a low density polyethylene, a linear low density polyethylene, a mixture of low density polyethylene with ethylene vinyl acetate, and a mixture of linear low density polyethylene with ethylene vinyl acetate.

The inner resin layer can have a surface resistivity between about $10^9$ to about $10^{12}$ ohm/in$^2$. The inner resin layer can have a thickness between about 0.015" and about 0.030". The inner resin layer can have a hardness between about 90 A and about 55 D durometer. The inner resin layer can have a specific gravity of between about 0.91 and about 1.2.

The outer resin layer can include one or more materials selected from the group consisting of: a polymer, a thermoplastic polymer, and a thermoset polymer.

The outer resin layer can have a surface resistivity between about $10^3$ and about $10^6$ ohm/in$^2$. The outer resin layer can have a thickness between about 0.012" and about 0.030". The outer resin layer can have a hardness between about 90 A and about 55 D durometer. The outer resin layer can have a specific gravity of between about 1.2 and about 1.5.

The metal foil can have a thickness between about 0.001" and about 0.005". The metal foil can be wrapped helically around said tubing. The metal foil can completely surround the inner resin layer. The metal foil can include one or more selected from the group consisting of: copper, aluminum, brass, bronze, silver, and gold.

The tubing can be corrugated tubing. The tubing can be metallic tubing. The tubing can be thin-walled tubing. The tubing can be flexible tubing.

The inner resin layer can be substantially free of a fire retardant selected from the group consisting of: metallic hydroxides, metallic trihydrates, and halogenated fire retardants. The inner resin layer can be substantially free of a fire retardant selected from the group consisting of: magnesium hydroxide, aluminum trihydrate, and antimony trioxide.

The outer resin layer can include a fire retardant selected from the group consisting of: metallic hydroxides, metallic trihydrates, and halogenated fire retardants. The outer resin layer can include a fire retardant selected from the group consisting of: magnesium hydroxide, aluminum trihydrate, and antimony trioxide.

Another aspect of the invention provides an energy dissipative tube including: a length of tubing; an inner resin layer surrounding an outer surface of said tubing, wherein said inner resin layer is conductive; a non-expanded metal foil adjacent to an outer surface of said inner resin layer; and an outer resin layer surrounding said metal foil and said inner resin layer, wherein said outer resin layer is static dissipative.

This aspect of the invention can have a variety of embodiments. The inner resin layer can include one or more materials selected from the group consisting of: a polymer, a thermoplastic polymer, and a thermoset polymer. The inner resin layer can include one or more materials selected from the group consisting of: a low density polyethylene, a linear low density polyethylene, a mixture of low density polyethylene with ethylene vinyl acetate, and a mixture of linear low density polyethylene with ethylene vinyl acetate.

The inner resin layer can have a surface resistivity between about $10^3$ and about $10^6$ ohm/in$^2$. The inner resin layer can have a thickness between about 0.015" and about 0.030". The inner resin layer can have a hardness between about 90 A and about 55 D durometer. The inner resin layer can have a specific gravity of between about 0.91 and about 1.2.

The outer resin layer can include one or more materials selected from the group consisting of: a polymer, a thermoplastic polymer, and a thermoset polymer.

The outer resin layer can have a surface resistivity between about $10^6$ and about $10^9$ ohm/in$^2$. The outer resin layer can have a thickness between about 0.012" and about 0.030". The outer resin layer can have a hardness between about 90 A and about 55 D durometer. The outer resin layer can have a specific gravity of between about 1.2 and about 1.5.

The metal foil can have a thickness between about 0.001" and about 0.005". The metal foil can be wrapped helically around said tubing. The metal foil can completely surround said inner resin layer. The metal foil can include one or more selected from the group consisting of: copper, aluminum, brass, bronze, silver, and gold.

The tubing can be corrugated tubing. The tubing can be metallic tubing. The tubing can be thin-walled tubing. The tubing can be flexible tubing.

The inner resin layer can be substantially free of a fire retardant selected from the group consisting of: metallic hydroxides, metallic trihydrates, and halogenated fire retardants. The inner resin layer can be substantially free of a fire retardant selected from the group consisting of: magnesium hydroxide, aluminum trihydrate, and antimony trioxide.

The outer resin layer can include a fire retardant selected from the group consisting of: metallic hydroxides, metallic trihydrates, and halogenated fire retardants. The outer resin layer can include a fire retardant selected from the group consisting of: magnesium hydroxide, aluminum trihydrate, and antimony trioxide.

Another aspect of the invention provides an energy dissipative tube including: a length of tubing; an inner resin layer surrounding an outer surface of said tubing, wherein said inner resin layer is conductive; a non-expanded metal foil adjacent to an outer surface of said inner resin layer; and an outer resin layer surrounding said metal foil and said inner resin layer, wherein said outer resin layer is antistatic.

This aspect of the invention can have a variety of embodiments. The inner resin layer can include one or more materials selected from the group consisting of: a polymer, a thermoplastic polymer, and a thermoset polymer. The inner resin layer can include one or more materials selected from the group consisting of: a low density polyethylene, a linear low density polyethylene, a mixture of low density polyethylene with ethylene vinyl acetate, and a mixture of linear low density polyethylene with ethylene vinyl acetate.

The inner resin layer can have a surface resistivity between about $10^3$ and about $10^6$ ohm/in$^2$. The inner resin layer can have a thickness between about 0.015" and about 0.030". The inner resin layer can have a hardness between about 90 A and about 55 D durometer. The inner resin layer can have a specific gravity of between about 0.91 and about 1.2.

The outer resin layer can include one or more materials selected from the group consisting of: a polymer, a thermoplastic polymer, and a thermoset polymer.

The outer resin layer can have a surface resistivity between about $10^9$ and about $10^{12}$ ohm/in$^2$. The outer resin layer can have a thickness between about 0.012" and about 0.030". The outer resin layer can have a hardness between about 90 A and about 55 D durometer. The outer resin layer can have a specific gravity of between about 1.2 and about 1.5.

The metal foil can have a thickness between about 0.001" and about 0.005". The metal foil can be wrapped helically around said tubing. The metal foil can completely surround said inner resin layer. The metal foil can include one or more selected from the group consisting of: copper, aluminum, brass, bronze, silver, and gold.

The tubing can be corrugated tubing. The tubing can be metallic tubing. The tubing can be thin-walled tubing. The tubing can be flexible tubing.

The inner resin layer can be substantially free of a fire retardant selected from the group consisting of: metallic hydroxides, metallic trihydrates, and halogenated fire retardants. The inner resin layer can be substantially free of a fire retardant selected from the group consisting of: magnesium hydroxide, aluminum trihydrate, and antimony trioxide.

The outer resin layer can include a fire retardant selected from the group consisting of: metallic hydroxides, metallic trihydrates, and halogenated fire retardants. The outer resin layer can include a fire retardant selected from the group consisting of: magnesium hydroxide, aluminum trihydrate, and antimony trioxide.

Another aspect of the invention provides an energy dissipative tube including: a length of tubing; an inner resin layer surrounding an outer surface of said tubing, wherein said inner resin layer is static dissipative; a non-expanded metal foil adjacent to an outer surface of said inner resin layer; and an outer resin layer surrounding said metal foil and said inner resin layer, wherein said outer resin layer is static dissipative.

This aspect of the invention can have a variety of embodiments. The inner resin layer can include one or more materials selected from the group consisting of: a polymer, a thermoplastic polymer, and a thermoset polymer. The inner resin layer can include one or more materials selected from the group consisting of: a low density polyethylene, a linear low density polyethylene, a mixture of low density polyethylene with ethylene vinyl acetate, and a mixture of linear low density polyethylene with ethylene vinyl acetate.

The inner resin layer can have a surface resistivity between about $10^6$ and about $10^9$ ohm/in$^2$. The inner resin layer can have a thickness between about 0.015" and about 0.030". The inner resin layer can have a hardness between about 90 A and about 55 D durometer. The inner resin layer can have a specific gravity of between about 0.91 and about 1.2.

The outer resin layer can include one or more materials selected from the group consisting of: a polymer, a thermoplastic polymer, and a thermoset polymer.

The outer resin layer can have a surface resistivity between about $10^6$ and about $10^9$ ohm/in$^2$. The outer resin layer can have a thickness between about 0.012" and about 0.030". The outer resin layer can have a hardness between about 90 A and about 55 D durometer. The outer resin layer can have a specific gravity of between about 1.2 and about 1.5.

The metal foil can have a thickness between about 0.001" and about 0.005". The metal foil can be wrapped helically around said tubing. The metal foil can completely surround said inner resin layer. The metal foil can include one or more selected from the group consisting of: copper, aluminum, brass, bronze, silver, and gold.

The tubing can be corrugated tubing. The tubing can be metallic tubing. The tubing can be thin-walled tubing. The tubing can be flexible tubing.

The inner resin layer can be substantially free of a fire retardant selected from the group consisting of: metallic hydroxides, metallic trihydrates, and halogenated fire retardants. The inner resin layer can be substantially free of a fire retardant selected from the group consisting of: magnesium hydroxide, aluminum trihydrate, and antimony trioxide.

The outer resin layer can include a fire retardant selected from the group consisting of: metallic hydroxides, metallic trihydrates, and halogenated fire retardants. The outer resin layer can include a fire retardant selected from the group consisting of: magnesium hydroxide, aluminum trihydrate, and antimony trioxide.

Another aspect of the invention provides an energy dissipative tube including: a length of tubing; an inner resin layer surrounding an outer surface of said tubing, wherein said inner resin layer is static dissipative; a non-expanded metal foil adjacent to an outer surface of said inner resin layer; and an outer resin layer surrounding said metal foil and said inner resin layer, wherein said outer resin layer is antistatic.

This aspect of the invention can have a variety of embodiments. The inner resin layer can include one or more materials selected from the group consisting of: a polymer, a thermoplastic polymer, and a thermoset polymer. The inner resin layer can include one or more materials selected from the group consisting of: a low density polyethylene, a linear low density polyethylene, a mixture of low density polyethylene with ethylene vinyl acetate, and a mixture of linear low density polyethylene with ethylene vinyl acetate.

The inner resin layer can have a surface resistivity between about $10^6$ and about $10^9$ ohm/in$^2$. The inner resin layer can have a thickness between about 0.015" and about 0.030". The inner resin layer can have a hardness between about 90 A and about 55 D durometer. The inner resin layer can have a specific gravity of between about 0.91 and about 1.2.

The outer resin layer can include one or more materials selected from the group consisting of: a polymer, a thermoplastic polymer, and a thermoset polymer.

The outer resin layer can have a surface resistivity between about $10^9$ and about $10^{12}$ ohm/in$^2$. The outer resin layer can have a thickness between about 0.012" and about 0.030". The outer resin layer can have a hardness between about 90 A and about 55 D durometer. The outer resin layer can have a specific gravity of between about 1.2 and about 1.5.

The metal foil can have a thickness between about 0.001" and about 0.005". The metal foil can be wrapped helically around said tubing. The metal foil can completely surround the inner resin layer. The metal foil can include one or more selected from the group consisting of: copper, aluminum, brass, bronze, silver, and gold.

The tubing can be corrugated tubing. The tubing can be metallic tubing. The tubing can be thin-walled tubing. The tubing can be flexible tubing.

The inner resin layer can be substantially free of a fire retardant selected from the group consisting of: metallic hydroxides, metallic trihydrates, and halogenated fire retardants. The inner resin layer can be substantially free of a fire retardant selected from the group consisting of: magnesium hydroxide, aluminum trihydrate, and antimony trioxide.

The outer resin layer can include a fire retardant selected from the group consisting of: metallic hydroxides, metallic trihydrates, and halogenated fire retardants. The outer resin layer can include a fire retardant selected from the group consisting of: magnesium hydroxide, aluminum trihydrate, and antimony trioxide.

Another aspect of the invention provides an energy dissipative tube including: a length of tubing; an inner resin layer surrounding an outer surface of said tubing, wherein said inner resin layer is antistatic; a non-expanded metal foil adjacent to an outer surface of said inner resin layer; and an outer resin layer surrounding said metal foil and said inner resin layer, wherein said outer resin layer is antistatic.

This aspect of the invention can have a variety of embodiments. The inner resin layer can include one or more materials selected from the group consisting of: a polymer, a thermoplastic polymer, and a thermoset polymer. The inner resin layer can include one or more materials selected from the group consisting of: a low density polyethylene, a linear low density polyethylene, a mixture of low density polyethylene with ethylene vinyl acetate, and a mixture of linear low density polyethylene with ethylene vinyl acetate.

The inner resin layer can have a surface resistivity between about $10^9$ to about $10^{12}$ ohm/in$^2$. The inner resin layer can have a thickness between about 0.015" and about 0.030". The inner resin layer can have a hardness between about 90 A and about 55 D durometer. The inner resin layer can have a specific gravity of between about 0.91 and about 1.2.

The outer resin layer can include one or more materials selected from the group consisting of: a polymer, a thermoplastic polymer, and a thermoset polymer.

The outer resin layer can have a surface resistivity between about $10^9$ and about $10^{12}$ ohm/in$^2$. The outer resin layer can have a thickness between about 0.012" and about 0.030". The outer resin layer can have a hardness between about 90 A and about 55 D durometer. The outer resin layer can have a specific gravity of between about 1.2 and about 1.5.

The metal foil can have a thickness between about 0.001" and about 0.005". The metal foil can be wrapped helically around said tubing. The metal foil can completely surround the inner resin layer. The metal foil can include one or more selected from the group consisting of: copper, aluminum, brass, bronze, silver, and gold.

The tubing can be corrugated tubing. The tubing can be metallic tubing. The tubing can be thin-walled tubing. The tubing can be flexible tubing.

The inner resin layer can be substantially free of a fire retardant selected from the group consisting of: metallic hydroxides, metallic trihydrates, and halogenated fire retardants. The inner resin layer can be substantially free of a fire retardant selected from the group consisting of: magnesium hydroxide, aluminum trihydrate, and antimony trioxide.

The outer resin layer can include a fire retardant selected from the group consisting of: metallic hydroxides, metallic trihydrates, and halogenated fire retardants. The outer resin layer can include a fire retardant selected from the group consisting of: magnesium hydroxide, aluminum trihydrate, and antimony trioxide.

Another aspect of the invention provides an energy dissipative tube comprising: a length of tubing; an inner resin layer surrounding an outer surface of said tubing, wherein said inner resin layer is antistatic; a non-expanded metal foil adjacent to an outer surface of said inner resin layer; and an outer resin layer surrounding said metal foil and said inner resin layer, wherein said outer resin layer is static dissipative.

This aspect of the invention can have a variety of embodiments. The inner resin layer can include one or more materials selected from the group consisting of: a polymer, a thermoplastic polymer, and a thermoset polymer. The inner resin layer can include one or more materials selected from the group consisting of: a low density polyethylene, a linear low density polyethylene, a mixture of low density polyethylene with ethylene vinyl acetate, and a mixture of linear low density polyethylene with ethylene vinyl acetate.

The inner resin layer can have a surface resistivity between about $10^9$ to about $10^{12}$ ohm/in$^2$. The inner resin layer can have a thickness between about 0.015" and about 0.030". The inner resin layer can have a hardness between about 90 A and about 55 D durometer. The inner resin layer can have a specific gravity of between about 0.91 and about 1.2.

The outer resin layer can include one or more materials selected from the group consisting of: a polymer, a thermoplastic polymer, and a thermoset polymer.

The outer resin layer can have a surface resistivity between about $10^6$ and about $10^9$ ohm/in$^2$. The outer resin layer can have a thickness between about 0.012" and about 0.030". The outer resin layer can have a hardness between about 90 A and about 55 D durometer. The outer resin layer can have a specific gravity of between about 1.2 and about 1.5.

The metal foil can have a thickness between about 0.001" and about 0.005". The metal foil can be wrapped helically around said tubing. The metal foil can completely surround the inner resin layer. The metal foil can include one or more selected from the group consisting of: copper, aluminum, brass, bronze, silver, and gold.

The tubing can be corrugated tubing. The tubing can be metallic tubing. The tubing can be thin-walled tubing. The tubing can be flexible tubing.

The inner resin layer can be substantially free of a fire retardant selected from the group consisting of: metallic hydroxides, metallic trihydrates, and halogenated fire retardants. The inner resin layer can be substantially free of a fire retardant selected from the group consisting of: magnesium hydroxide, aluminum trihydrate, and antimony trioxide.

The outer resin layer can include a fire retardant selected from the group consisting of: metallic hydroxides, metallic trihydrates, and halogenated fire retardants. The outer resin layer can include a fire retardant selected from the group consisting of: magnesium hydroxide, aluminum trihydrate, and antimony trioxide.

Another aspect of the invention provides a method of fabricating energy dissipative tube. The method includes: providing a length of tubing; applying an inner resin layer surrounding an outer surface of said tubing, wherein said inner resin layer is substantially free of a fire retardant; applying a non-expanded metal foil adjacent to an outer surface of said inner resin layer; and applying an outer resin layer surrounding said metal foil and said inner resin layer, wherein said outer resin layer includes a fire retardant.

Another aspect of the invention provides a method of fabricating energy dissipative tube. The method includes: providing a length of tubing; applying an inner resin layer surrounding an outer surface of said tubing, wherein said inner resin layer is static dissipative; applying a non-expanded metal foil adjacent to an outer surface of said inner resin layer; and applying an outer resin layer surrounding said metal foil and said inner resin layer, wherein said outer resin layer is conductive.

Another aspect of the invention provides a method of fabricating energy dissipative tube. The method includes: providing a length of tubing; applying an inner resin layer surrounding an outer surface of said tubing, wherein said inner resin layer is antistatic; applying a non-expanded metal foil adjacent to an outer surface of said inner resin layer; and applying an outer resin layer surrounding said metal foil and said inner resin layer, wherein said outer resin layer is conductive.

Another aspect of the invention provides a method of fabricating energy dissipative tube. The method includes: providing a length of tubing; applying an inner resin layer surrounding an outer surface of said tubing, wherein said inner resin layer is conductive; applying a non-expanded metal foil adjacent to an outer surface of said inner resin layer; and applying an outer resin layer surrounding said metal foil and said inner resin layer, wherein said outer resin layer is static dissipative.

Another aspect of the invention provides a method of fabricating energy dissipative tube. The method includes: providing a length of tubing; applying an inner resin layer surrounding an outer surface of said tubing, wherein said inner resin layer is conductive; applying a non-expanded metal foil adjacent to an outer surface of said inner resin layer; and applying an outer resin layer surrounding said metal foil and said inner resin layer, wherein said outer resin layer is antistatic.

Another aspect of the invention provides a method of fabricating energy dissipative tube. The method includes: providing a length of tubing; applying an inner resin layer surrounding an outer surface of said tubing, wherein said inner resin layer is static dissipative; applying a non-expanded metal foil adjacent to an outer surface of said inner resin layer; and applying an outer resin layer surrounding said metal foil and said inner resin layer, wherein said outer resin layer is static dissipative.

Another aspect of the invention provides a method of fabricating energy dissipative tube. The method includes: providing a length of tubing; applying an inner resin layer surrounding an outer surface of said tubing, wherein said inner resin layer is static dissipative; applying a non-expanded metal foil adjacent to an outer surface of said inner resin layer; and applying an outer resin layer surrounding said metal foil and said inner resin layer, wherein said outer resin layer is antistatic.

Another aspect of the invention provides a method of fabricating energy dissipative tube. The method includes: providing a length of tubing; applying an inner resin layer surrounding an outer surface of said tubing, wherein said inner resin layer is antistatic; applying a non-expanded metal foil adjacent to an outer surface of said inner resin layer; and applying an outer resin layer surrounding said metal foil and said inner resin layer, wherein said outer resin layer is antistatic.

Another aspect of the invention provides a method of fabricating energy dissipative tube. The method includes: providing a length of tubing; applying an inner resin layer surrounding an outer surface of said tubing, wherein said inner resin layer is antistatic; applying a non-expanded metal foil adjacent to an outer surface of said inner resin layer; and applying an outer resin layer surrounding said metal foil and said inner resin layer, wherein said outer resin layer is static dissipative.

Another aspect of the invention provides a method of installing energy dissipative tube. The method includes: providing a length of energy dissipative tubing including a length of tubing, an inner resin layer surrounding an outer surface of said tubing, a non-expanded metal foil adjacent to an outer surface of said inner resin layer, and an outer resin layer surrounding said metal foil and said inner resin layer; and coupling a fitting to an end of the energy dissipative tubing, wherein said fitting creates electrical continuity with said metal foil. The inner resin layer is substantially free of a fire retardant. The outer resin layer includes a fire retardant.

Another aspect of the invention provides a method of installing energy dissipative tube. The method includes: providing a length of energy dissipative tubing including a length of tubing, an inner resin layer surrounding an outer surface of said tubing, a non-expanded metal foil adjacent to an outer surface of said inner resin layer, and an outer resin layer surrounding said metal foil and said inner resin layer; and coupling a fitting to an end of the energy dissipative tubing, wherein said fitting creates electrical continuity with said metal foil. The inner resin layer is static dissipative. The outer resin layer is conductive.

Another aspect of the invention provides a method of installing energy dissipative tube. The method includes: providing a length of energy dissipative tubing including a length of tubing, an inner resin layer surrounding an outer surface of said tubing, a non-expanded metal foil adjacent to an outer surface of said inner resin layer, and an outer resin layer surrounding said metal foil and said inner resin layer; and coupling a fitting to an end of the energy dissipative tubing, wherein said fitting creates electrical continuity with said metal foil. The inner resin layer is antistatic. The outer resin layer is conductive.

Another aspect of the invention provides a method of installing energy dissipative tube. The method includes: providing a length of energy dissipative tubing including a length of tubing, an inner resin layer surrounding an outer surface of said tubing, a non-expanded metal foil adjacent to an outer surface of said inner resin layer, and an outer resin layer surrounding said metal foil and said inner resin layer; and coupling a fitting to an end of the energy dissipative tubing, wherein said fitting creates electrical continuity with said metal foil. The inner resin layer is conductive. The outer resin layer is static dissipative.

Another aspect of the invention provides a method of installing energy dissipative tube. The method includes: providing a length of energy dissipative tubing including a length of tubing, an inner resin layer surrounding an outer surface of said tubing, a non-expanded metal foil adjacent to an outer surface of said inner resin layer, and an outer resin layer surrounding said metal foil and said inner resin layer; and coupling a fitting to an end of the energy dissipative tubing, wherein said fitting creates electrical continuity with said metal foil. The inner resin layer is conductive. The outer resin layer is antistatic.

Another aspect of the invention provides a method of installing energy dissipative tube. The method includes: providing a length of energy dissipative tubing including a length of tubing, an inner resin layer surrounding an outer surface of said tubing, a non-expanded metal foil adjacent to an outer surface of said inner resin layer, and an outer resin layer surrounding said metal foil and said inner resin layer; and coupling a fitting to an end of the energy dissipative tubing, wherein said fitting creates electrical continuity with said metal foil. The inner resin layer is static dissipative. The outer resin layer is static dissipative.

Another aspect of the invention provides a method of installing energy dissipative tube. The method includes: providing a length of energy dissipative tubing including a length of tubing, an inner resin layer surrounding an outer surface of said tubing, a non-expanded metal foil adjacent to an outer surface of said inner resin layer, and an outer resin layer surrounding said metal foil and said inner resin layer; and coupling a fitting to an end of the energy dissipative tubing, wherein said fitting creates electrical continuity with said metal foil. The inner resin layer is static dissipative. The outer resin layer is antistatic.

Another aspect of the invention provides a method of installing energy dissipative tube. The method includes: providing a length of energy dissipative tubing including a length of tubing, an inner resin layer surrounding an outer surface of said tubing, a non-expanded metal foil adjacent to an outer surface of said inner resin layer, and an outer resin layer surrounding said metal foil and said inner resin layer; and coupling a fitting to an end of the energy dissipative tubing, wherein said fitting creates electrical continuity with said metal foil. The inner resin layer is antistatic. The outer resin layer is antistatic.

Another aspect of the invention provides a method of installing energy dissipative tube. The method includes: providing a length of energy dissipative tubing including a length of tubing, an inner resin layer surrounding an outer surface of said tubing, a non-expanded metal foil adjacent to an outer surface of said inner resin layer, and an outer resin layer surrounding said metal foil and said inner resin layer; and coupling a fitting to an end of the energy dissipative tubing, wherein said fitting creates electrical continuity with said metal foil. The inner resin layer is antistatic. The outer resin layer is static dissipative.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views and wherein.

DEFINITIONS

The instant invention is most clearly understood with reference to the following definitions:

As used herein, the singular form "a," "an," and "the" include plural references unless the context clearly dictates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

As used herein, the term "alloy" refers to a homogenous mixture or metallic solid solution composed of two or more elements. Examples of alloys include austenitic nickel-chromium-based superalloys, brass, bronze, steel, low carbon steel, phosphor bronze, stainless steel, and the like.

As used herein, the terms "comprises," "comprising," "containing," "having," and the like can have the meaning ascribed to them under U.S. patent law and can mean "includes," "including," and the like.

As used herein, the terms "corrugated stainless steel tubing" and "CSST" refer to any type of tubing or piping, which may accommodate corrosive or aggressive gases or liquids, and includes but is not limited to tubing or piping made from: thermoplastics, metal, or metal alloy materials such as olefin-based plastics (e.g., polyethylene (PE)), fluorocarbon polymers (e.g., polytetrafluoroethylene (PTFE)), carbon steel, copper, brass, aluminum, titanium, nickel, and alloys thereof.

Unless specifically stated or obvious from context, the term "or," as used herein, is understood to be inclusive.

As used herein, the term "metal" refers to any chemical element that is a good conductor of electricity and/or heat. Examples of metals include, but are not limited to, aluminum, cadmium, niobium (also known as "columbium"), copper, gold, iron, nickel, platinum, silver, tantalum, titanium, zinc, zirconium, and the like.

As used herein, the term "resin" refers to any synthetic or naturally occurring polymer.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (as well as fractions thereof unless the context clearly dictates otherwise).

DETAILED DESCRIPTION OF THE INVENTION

Corrugated Tubing

Figure 1:
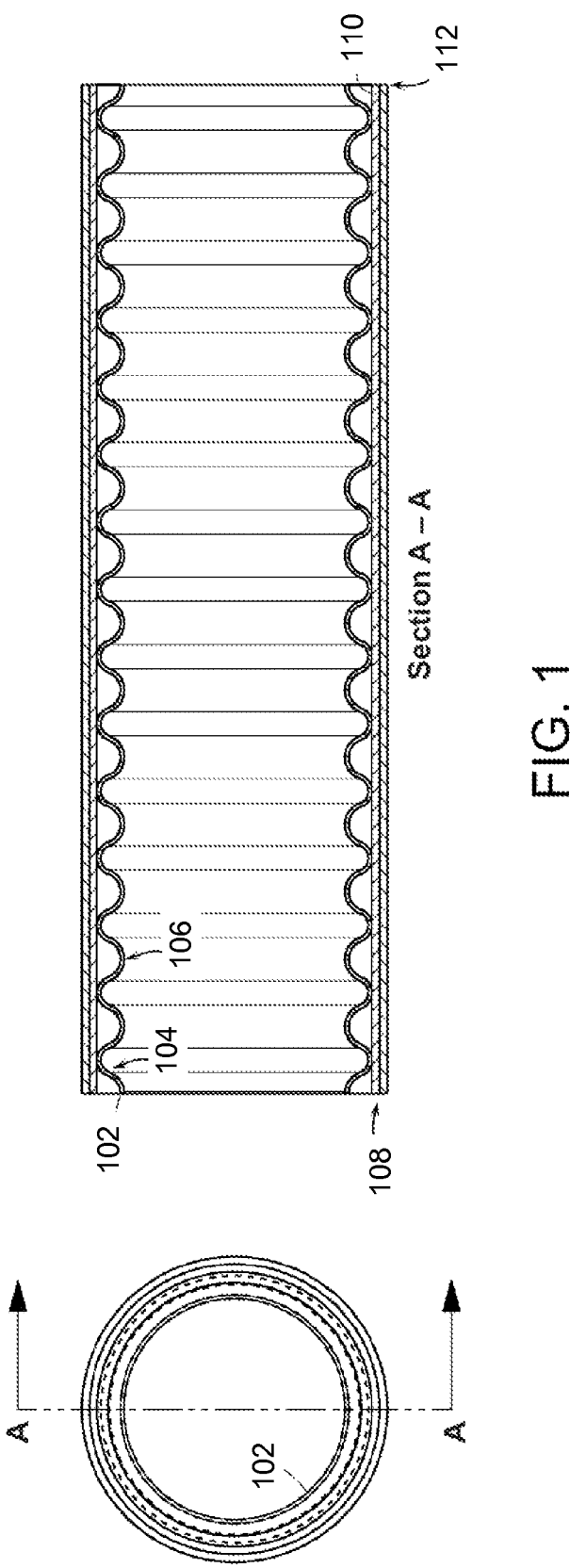
FIG. 1 depicts a multi-layer jacketed tube in accordance with the prior art.

Referring to FIG. 1, a length of tubing 100 is provided. The tubing can include corrugated tubing 102, which can be composed of stainless steel or any other suitable material. The tubing 102 contains a number of corrugation peaks 104 and corrugation valleys 106. A jacket 108 (e.g., a multi-layer jacket) covers the outside of the tubing 102.

The jacket 108 can include a plurality of layers 110, 112. The layers 110, 112 generally form an annulus around the tubing 102, but may have a circular or non-circular cross-section.

Energy Dissipative Tubing

Figure 2:
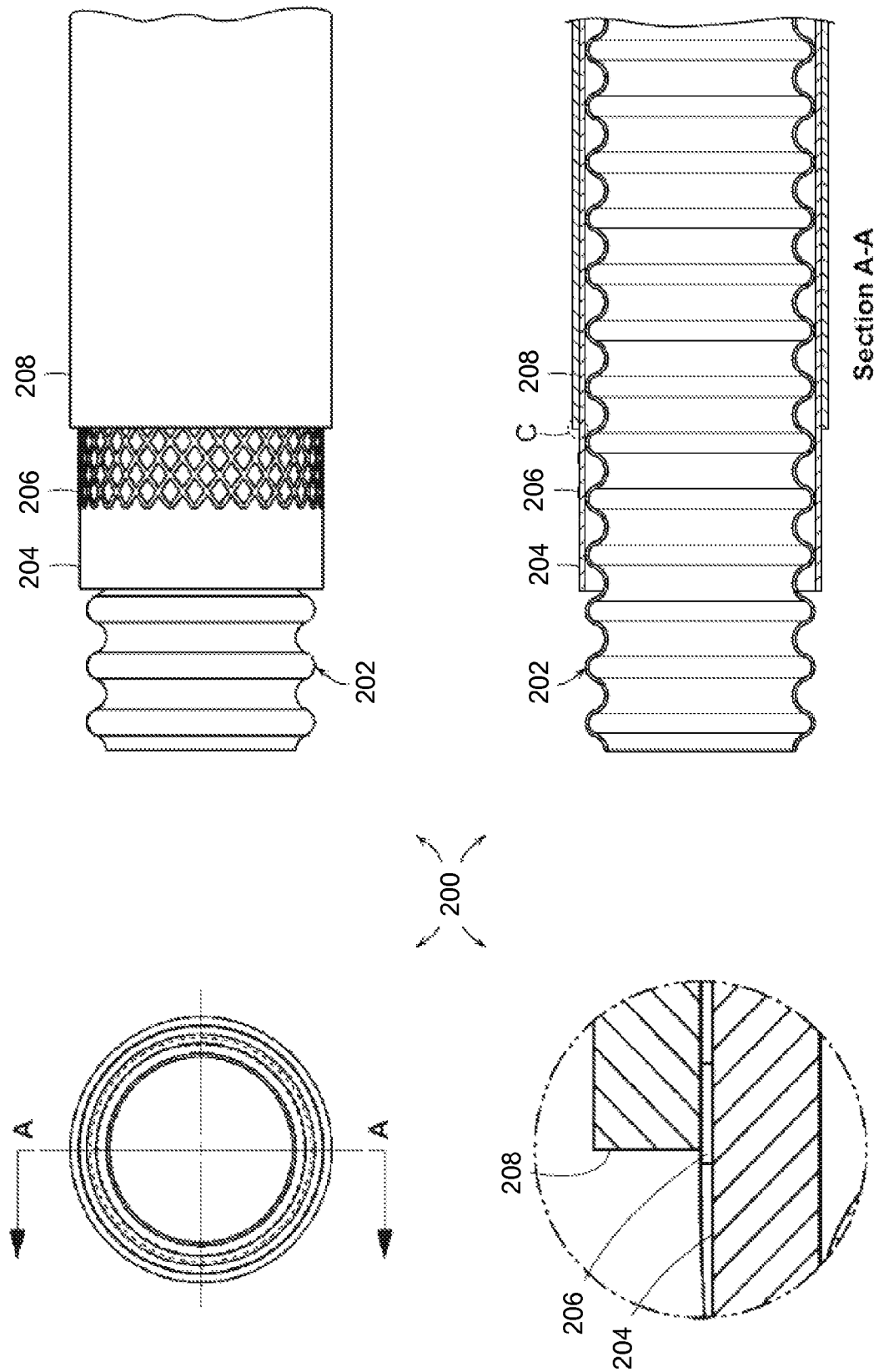
FIG. 2 depicts an energy dissipative tube in accordance with the prior art.

Referring now to FIG. 2, in order to better absorb energy from fault currents and lightning strikes, energy dissipative jackets are provided that dissipate electrical and thermal energy throughout the respective jackets, thereby protecting the tubing 202. The term "dissipate" encompasses distributing electrical energy to an appropriate grounding device such as a fitting.

Preferred embodiments of energy dissipative jackets preferably include one or more conductive layers for distributing electricity and heat. The conductive layers can include, for example, conductive resins and/or metals as discussed herein.

One embodiment of energy dissipative tubing 200 is depicted in FIG. 2. The energy dissipative tubing 200 includes a length of tubing 202. The tubing 202 can be metal tubing, thin-walled metal tubing, corrugated tubing, corrugated stainless steel tubing, or the like.

Tubing 202 is surrounded by a first resin layer 204, a metal layer 206, and a second resin layer 208. Resin layers can be formed from a variety of materials. In some embodiments, an insulating elastic layer includes polytetrafluoroethylene (PTFE). Other suitable insulators include polyolefin compounds, thermoplastic polymers, thermoset polymers, polymer compounds, polyethylene, crosslinked polyethylene, UV-resistant polyethylene, ethylene-propylene rubber, silicone rubber, polyvinyl chloride (PVC), ethylene tetrafluoroethylene (ETFE), and ethylene propylene diene monomer (EPDM) rubber.

In some embodiments, each resin layer 204, 208 has a thickness of about 0.015" to about 0.035".

Metal layer 206 can include one or more metals (e.g., ductile metals) and alloys thereof. The metal(s) can be formed into foils, perforated foils, tapes, perforated tapes, cables, wires, strands, meshes, braids, and the like.

In some embodiments, the metal layer 206 is an expanded metal foil as further described in U.S. Patent Application Publication No. 2011-0041944. A variety of expanded metal foils are available from the Dexmet Corporation of Wallingford, Conn. An exemplary embodiment of energy dissipative tubing 200 with expanded metal foil is depicted in FIG. 2.

In some embodiments, the metal layer 206 completely surrounds the first resin layer 24. In such embodiments, the metal may overlap and/or be welded or soldered in some regions. In other embodiments, the metal layer 206 substantially surrounds the first resin layer 204. In such embodiments, a small portion of the first resin layer 204 (e.g., less than about 1°, less than about 2°, less than about 3°, less than about 4°, less than about 5°, less than about 10°, less than about 15°, less than about 20°, and the like) is not surrounded by the metal layer 26. In still other embodiments, the metal layer 206 can be wrapped spirally or helically around the first resin layer 204. In such an embodiment, the metal layer 26 can overlap or substantially surround the first resin layer 204

In some embodiments, the metal layer 206 is a non-expanded metal foil, such as aluminum or copper foil that can, in some embodiments, completely envelop the inner resin layer 206 (e.g., through helical winding as discussed herein). An example of a such tubing is depicted in FIG. 3, wherein like reference numerals correspond to like elements described in the context of in FIG. 2.

Various thicknesses of the resin layers 204, 208 and the metal layer 206 can be selected to achieve desired resistance to lightning strikes and physical damage while maintaining desired levels of flexibility. In embodiments including an expanded metal foil, the mass per area can be adjusted to provide an appropriate amount of energy dissipation. The resin layers 204, 208 can be the same or different thickness and can include the same or different materials. Various colors (e.g., yellow, orange, red, and the like) or markings can be added to resin layers, for example, to clearly distinguish the resin layers 204, 208 from each other and from the metal layer 206, to make the tubing 200 more conspicuous, meet various code requirements, and/or conform to industry standards and practices.

Electrical Properties or Resin Layers

Figure 3:
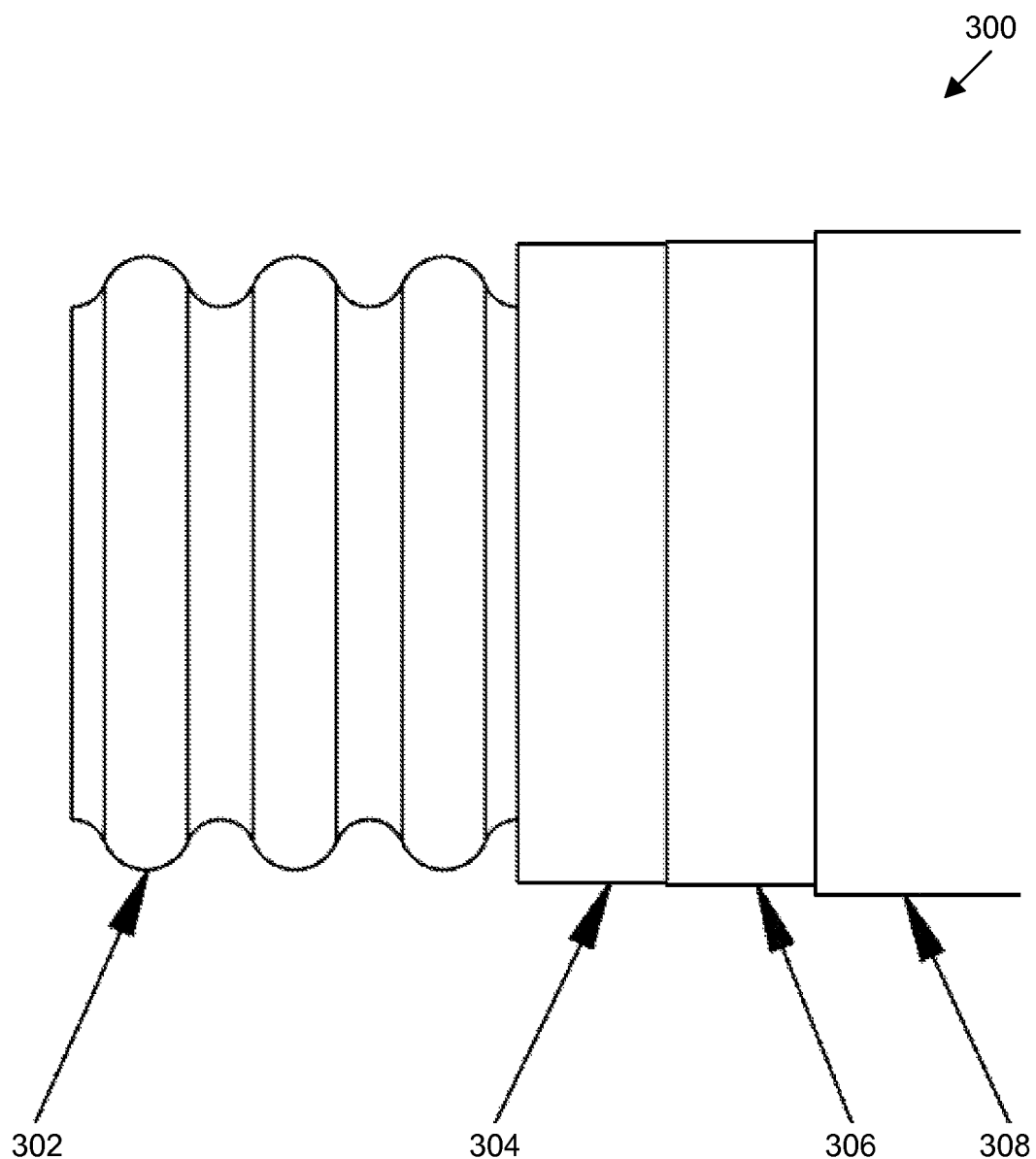
FIG. 3 depicts an energy dissipative tube including a non-expanded metal foil layer in accordance with embodiments of the invention.

Still referring to FIGS. 2 and 3, the first resin layer 204, 304 and the outer resin layer 208, 308 can be configured to have a variety of electrical properties in order to promote the transmission of electrical energy through the resin layers, the metal foil layers, and/or the underlying tubing in varying degrees.

Resins can be have varying degrees of conductivity based on the inherent physical properties of the resin and/or the physical properties of additives such as metal particles (e.g., copper, aluminum, gold, silver, nickel, and the like), carbon black, carbon fibers, or other conductive additives. For example, tubing can include various permutations of conductive, static dissipative, antistatic, and/or non-conductive resins as discussed below.

A "conductive" resin permits the efficient flow of electrons. For example, a conductive resin can have a surface resistivity between about $10^3$ and about $10^6$ ohm/in$^2$ as tested in accordance with ASTM standard D257.

A "static dissipative" resin will slowly conduct static charges away. For example, such materials can have a surface resistivity between about $10^6$ and about $10^9$ ohm/in$^2$ as tested in accordance with ASTM standard D257.

An "antistatic" resin will resist the accumulation of static charges on the resin. For example, an antistatic resin can have a surface resistivity between about $10^9$ and about $10^{12}$ ohm/as tested in accordance with ASTM standard D257.

A "non-conductive" resin will substantially inhibit the flow of electrons through the resin. For example a non-conductive resin can have a surface resistivity above about $10^{12}$ ohm/in$^2$ as tested in accordance with ASTM standard D257.

As discussed above, various permutations of electrical properties can be selected to achieve a desired electrical flow. The following table shows all possible permutations for tubing having an inner resin layer and an outer resin layer.

|  |  | Outer Resin Layer | | | |
|---|---|---|---|---|---|
|  |  | Conductive | Static Dissipative | Anti-static | Non-Conductive |
| Inner Resin Layer | Conductive | X | X | X | X |
|  | Static Dissipative | X | X | X | X |
|  | Antistatic | X | X | X | X |
|  | Non-Conductive | X | X | X | X |

One of ordinary skill in the art will readily appreciate that similar permutations can be identified for tubing having more than two resin layers.

Selective Incorporation of Fire Retardants

Various building codes require that building materials such as CSST and other conduits meet certain flame spread and/or smoke density standards such as the ASTM E84 standard set by ASTM International of West Conshohocken, Pa. In order to meet this standard, various flame retardants can be incorporated into the resin layer(s) of CSST.

Suitable flame retardants can slow the spread of flame (and thus, the spread of smoke) through a variety of mechanisms of action. For example, some flame retardants such as magnesium hydroxide, aluminum hydroxide, and various hydrates (e.g., hydromagnesite) undergo endothermic degradation, in which the flame retardant breaks down endothermically when subjected to high temperatures. This reaction removes heat from the resin to cool the material and slow the spread of flames.

Other flame retardants facilitate gas phase radical quenching. Halogenated materials (e.g., chlorinated and brominated materials) undergo thermal degradation and release hydrogen chloride or hydrogen bromide, which react with the highly reactive H. and OH. radicals in the flame to produce an inactive molecule and a Cl. or Br. radical. The halogen radical has much lower energy than H. or OH., and therefore has much lower potential to propagate the radical oxidation reactions of combustion.

Examples of specific flame retardants include metallic hydroxides (e.g., magnesium hydroxide, aluminum hydroxide), hydrates, metallic hydrates (e.g., aluminum trihydrate), organohalogen compounds (e.g., organochlorides, chlorendic acid derivatives, chlorinated paraffins, organobromides, decabromodiphenyl ether, decabromodiphenyl ethane, polymeric brominated compounds brominated polystyrenes, brominated carbonate oligomers, brominated epoxy oligomers, tetrabromophthalic anhydride, tetrabromobisphenol A, and hexabromocyclododecane), organophosphorus compounds (e.g., organophosphates, tris(2,3-dibromopropyl)phosphate, TPP, RDP, BPADP, tri-o-cresyl phosphate, phosphonates, DMMP, phosphinates), and the like.

In order to meet code requirements, existing multi-layered CSST and conduits include flame retardant in each layer. Using the tubing 100 and 200 depicted in FIGS. 1 and 2, respectively, as examples, fire retardant would be included not only in outer jacket layers 112, 208, but also in inner jacket layers 110, 204. However, the inclusion of fire retardant in all resin layers increases the cost of the tubing can alter the physical properties (e.g., flexibility, resiliency, and the like) of the underlying resin.

Referring again to FIG. 3, embodiments of the invention eliminate the cost and disadvantages of fire retardant within inner resin layer(s) 304 by enclosing the inner resin layers in a non-expanded metal foil layer 306. This non-expanded metal foil layer shields the inner resin layer from heat, oxygen, and ignition.

Fire retardants can continue to be incorporated into the outer resin layer 308 in accordance with known practices and standards. For example, the outer resin layer 308 can be a polymer incorporating about 20% to 60% magnesium hydroxide, aluminum trihydrate, antimony trioxide, and/or halogenated fire retardants by weight. In some embodiments, the outer resin layer(s) have a 25/50 flame spread/smoke density index as measured in accordance with the ASTM E84 standard.

Additional Layer Features

In further embodiments of the invention, one or more layers of the jacket possess various properties such as heat resistance, sound insulation, temperature insulation, oil or water impermeability, and/or wear resistance.

In order to better comply with installation requirements, some embodiments of resin layers are capable of elongation greater than or equal to about 200% as measured in accordance with the ASTM D638 standard.

In other embodiments, the outer layer(s) include wear resistant materials such as wire, cable, strands of material such as poly-aramid synthetic fiber such as KEVLAR® (available from E.I. Du Pont de Nemours and Company of Wilmington, Del.), and the like. Such materials may be incorporated within a polymer or resin layer or may be exposed. In some embodiments, a layer is formed by twisting an interlocking metal strip around the tubing and underlying jacket layers similar to the metal sheath on BX or TECK type electrical cables.

Although embodiments of the invention having two or three layer jackets are depicted and discussed herein, the invention is not limited to jackets having particular number of layers. Rather, additional embodiments in which a jacket includes more than three layers are contemplated according to the principles, patterns, and spirit of the specific embodiments described herein.

Methods of Fabricating Energy Dissipative Tubing

Figure 4:
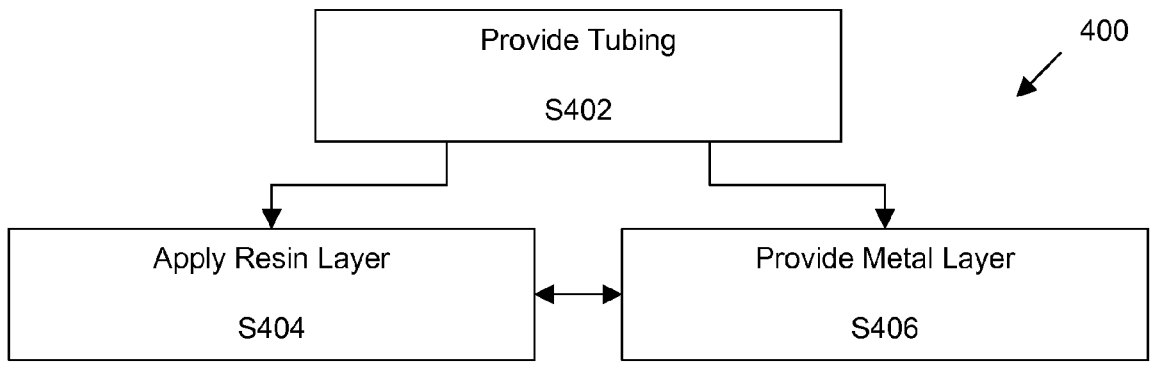
FIG. 4 depicts a method of fabricating an energy dissipative tube in accordance with embodiments of the invention.

Energy dissipative tubing can be fabricated in accordance with existing techniques for the manufacture of CSST. An exemplary method 400 for fabricating energy dissipative tubing is depicted in FIG. 4.

In step S402, a length of tubing is provided. The tubing can be metal tubing, thin-walled metal tubing, corrugated tubing, corrugated stainless steel tubing, and the like. Embodiments of suitable tubing are described herein.

In step S404, a resin layer is applied to the exterior of the tubing (and any intervening jacket layers). The resin layer can be applied by known extrusion techniques. As discussed herein, this resin layer can be substantially free from a fire retardant. Additionally or alternatively, this resin layer can have a conductive, static dissipative, antistatic, or non-conductive property.

In step S406, a metal layer is applied to the exterior of the tubing (and any intervening jacket layers). The metal layer can be applied by a variety of techniques. For example, metal foils can be helically wound, preferably so that the foil overlaps in order to completely envelop any underlying jacket layers. Alternatively, the metal foil can extend axially along the length of the tubing and be rolled such that the edges of the foil run axially, preferably with an overlap to completely envelop any underlying jacket layers. In some embodiments, an adhesive (e.g., an electrically conductive adhesive) is used to secure the metal layer to the tubing and/or an intervening jacket layer.

As will be appreciated, steps S404 and S406 can be repeated in variety of patterns. For example, consecutive resin and/or metal layers can be applied to the tubing.

In some embodiments, the metal layer is embedded or partially embedded in one or both of the resin layers. This can be accomplished by pressing the metal layer into the resin layer while the resin is curing. In other embodiments, the metal is applied over a cured resin layer (e.g., to aid in easy removal of the metal layer for installation and/or recycling).

Methods of Installing Energy Dissipative Tubing

Figure 5:
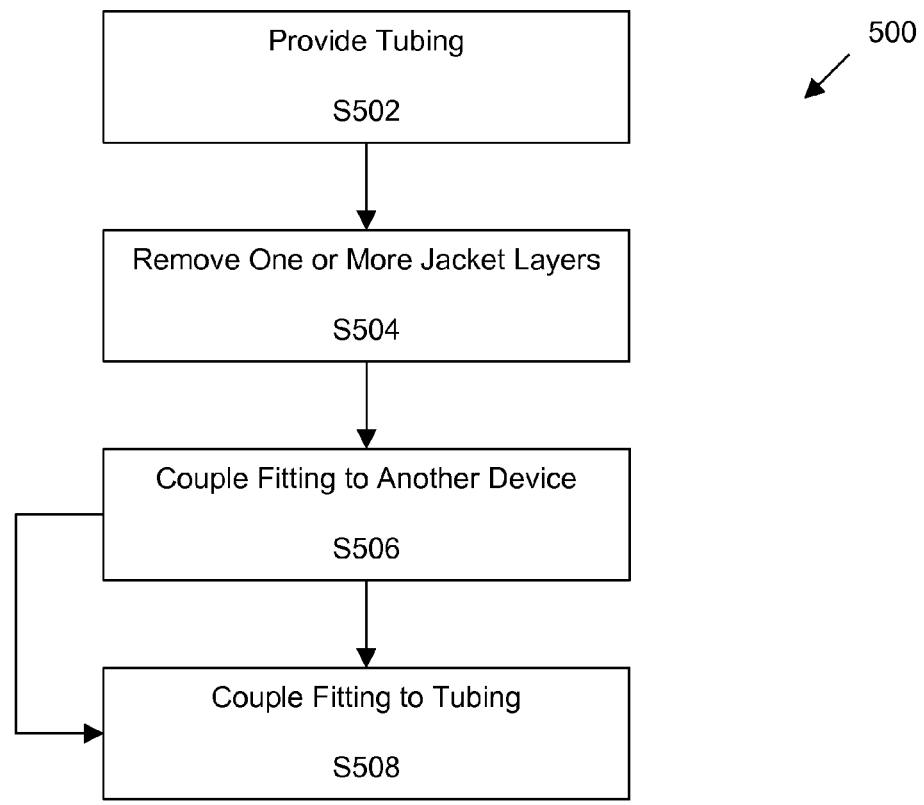
FIG. 5 depicts a method of installing an energy dissipative tube in accordance with embodiments of the invention.

Energy dissipative tubing can be installed in accordance with existing techniques for the manufacture of CSST. An exemplary method 500 for installing energy dissipative tubing is depicted in FIG. 5.

In step S502, a length of energy dissipative tubing is provided. Tubing may be provided in lengths (e.g., 8' sticks) or on reels.

In step S504, one or more jacket layers are optionally removed in accordance with the instructions for a fitting. The one or more layers can be removed with existing tools such as a utility knife, a razor blade, a tubing cutter, and the like.

In step S506, the fitting is optionally coupled to another device. For example, the fitting can be coupled to a source of a fuel gas such as a pipe, a manifold, a meter, a gas main, a tank, and the like. In another example, the sealing device can be coupled to an appliance that consumes a fuel gas such as a stove, an oven, a grill, a furnace, a clothes dryer, a fire place, a generator, and the like. The fitting can be coupled to the other device by threaded or other attachments. In some circumstances, pipe seal tape (e.g., polytetrafluoroethylene tape) or pipe seal compound (commonly referred to as "pipe dope") is utilized to facilitate a gastight seal between the sealing device and the other device.

Figure 6:
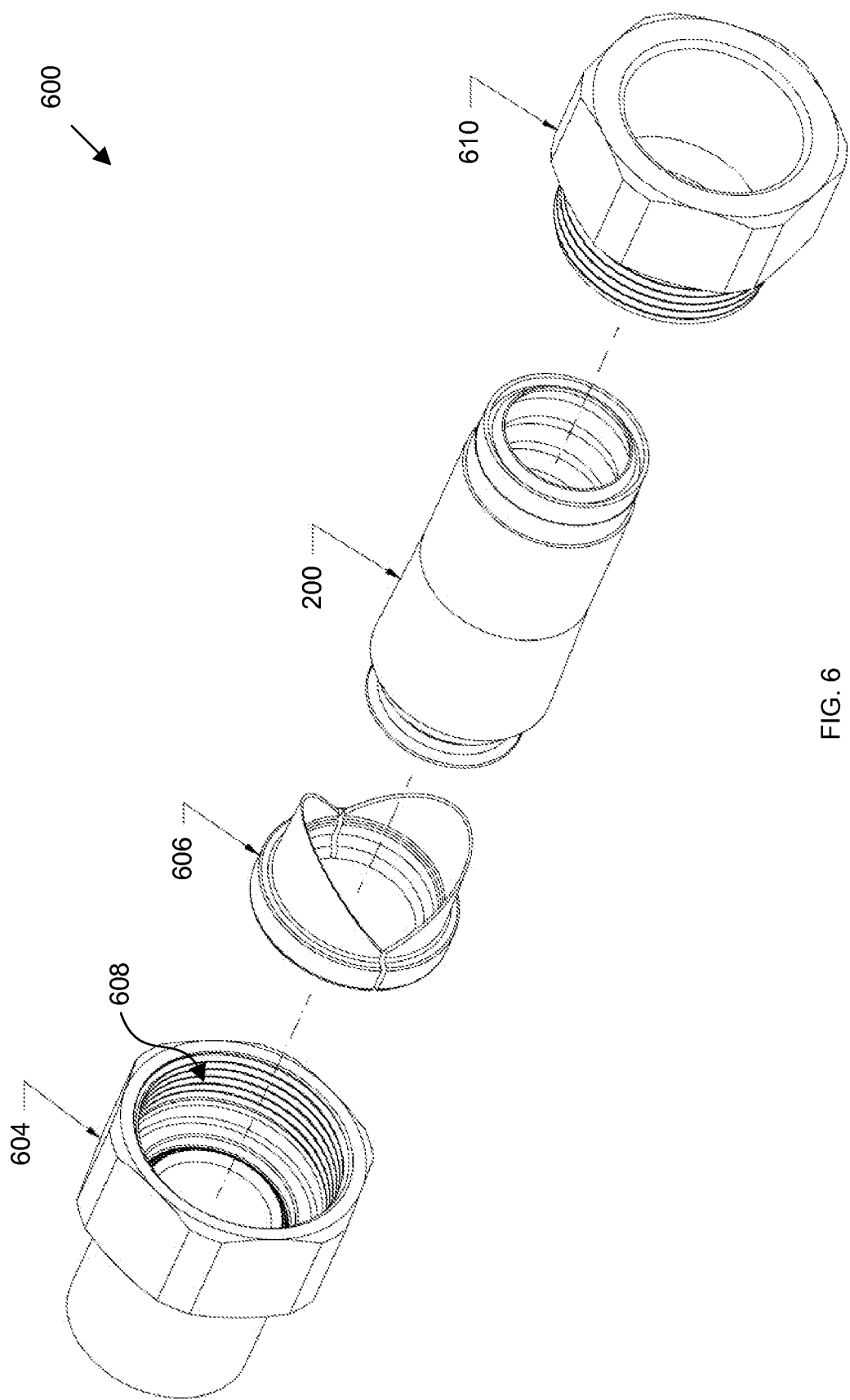
FIG. 6 depicts an exploded view of a sealing device and tubing assembly 600. The assembly 600 allows for the sealing and coupling of an end of tubing 200 to a pipe, a manifold, an appliance, and the like (not depicted). For example, after body member 604 is threaded onto a manifold (not depicted), tubing 200 and bushing 606 can be placed inside the sleeve portion 608 of the body member 304 and sealed by advancing a nut 610 as further discussed below.

In step S508, the fitting is coupled to the tubing in accordance with the instructions for the fitting. The fitting may, in some embodiments, contact one or more conductive layers (e.g., conductive resin layers or metal layers) to create electrical continuity between the conductive layer(s) and the fitting, thereby grounding the conductive layer(s). For example, the fitting can include one or more conductive teeth that penetrate an outer resin layer to ground the metal layer as described in U.S. Patent Application Publication No. US 2011-0042139 or one or more conductive fingers that are fit between jacket layers as described in U.S. patent application Ser. No. 13/584,074, filed Aug. 13, 2012, and depicted in FIG. 6.

INCORPORATION BY REFERENCE

The entire contents of all patents, published patent applications, and other references cited herein are hereby expressly incorporated herein in their entireties by reference.

The invention claimed is:

1. An energy dissipative tube comprising:
   a length of tubing;
   an inner resin layer surrounding an outer surface of said tubing, wherein said inner resin layer is substantially free of a fire retardant;
   a non-expanded metal foil adjacent to and completely surrounding an outer surface of said inner resin layer; and
   an outer resin layer surrounding said metal foil and said inner resin layer, wherein said outer resin layer includes a fire retardant.

2. The energy dissipative tube of claim 1, wherein said inner resin layer is conductive.

3. The energy dissipative tube of claim 1, wherein said inner resin layer is static dissipative.

4. The energy dissipative tube of claim 1, wherein said inner resin layer is antistatic.

5. The energy dissipative tube of claim 1, wherein said outer resin layer is conductive.

6. The energy dissipative tube of claim 1, wherein said outer resin layer is static dissipative.

7. The energy dissipative tube of claim 1, wherein said outer resin layer is antistatic.

8. The energy dissipative tube of claim 1, wherein said metal foil is wrapped helically around said tubing.

9. The energy dissipative tube of claim 1, wherein said tubing is corrugated tubing.

10. The energy dissipative tube of claim 1, wherein said inner resin layer is substantially free of a fire retardant selected from the group consisting of: metallic hydroxides, metallic trihydrates, and halogenated fire retardants.

11. The energy dissipative tube of claim 1, wherein said inner resin layer is substantially free of a fire retardant selected from the group consisting of: magnesium hydroxide, aluminum trihydrate, and antimony trioxide.

12. The energy dissipative tube of claim 1, wherein said inner resin layer includes less than 5% of said fire retardant by weight.

13. The energy dissipative tube of claim 1, wherein said inner resin layer includes less than 1% of said fire retardant by weight.

14. The energy dissipative tube of claim 1, wherein said outer resin layer includes a fire retardant selected from the group consisting of: metallic hydroxides, metallic trihydrates, and halogenated fire retardants.

15. The energy dissipative tube of claim 1, wherein said outer resin layer includes a fire retardant selected from the group consisting of: magnesium hydroxide, aluminum trihydrate, and antimony trioxide.

16. The energy dissipative tube of claim 1, wherein said outer resin layer includes between about 20% and about 60% of said fire retardant by weight.

* * * * *